United States Patent
Lee et al.

(10) Patent No.: US 6,629,271 B1
(45) Date of Patent: Sep. 30, 2003

(54) TECHNIQUE FOR SYNCHRONIZING FAULTS IN A PROCESSOR HAVING A REPLAY SYSTEM

(75) Inventors: Yung-Hsiang Lee, Beaverton, OR (US); Douglas M. Carmean, Beaverton, OR (US); Rohit A. Vidwans, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/472,839

(22) Filed: Dec. 28, 1999

(51) Int. Cl.[7] .................................................. H02H 3/05
(52) U.S. Cl. ........................................... 714/49; 714/12
(58) Field of Search ............................. 714/49, 48, 51, 714/12, 744; 712/218, 219

(56) References Cited

U.S. PATENT DOCUMENTS

| | | | | |
|---|---|---|---|---|
| 5,197,132 A | * | 3/1993 | Steely et al. ................. | 711/109 |
| 5,341,482 A | * | 8/1994 | Cutler et al. ................. | 712/244 |
| 5,828,868 A | * | 10/1998 | Sager et al. ................... | 712/32 |
| 5,835,745 A | * | 11/1998 | Sager et al. ................. | 712/214 |
| 5,966,544 A | * | 10/1999 | Sager ............................. | 712/1 |
| 6,163,838 A | * | 12/2000 | Merchant et al. ............ | 712/218 |
| 6,385,715 B1 | * | 5/2002 | Merchant et al. ........... | 709/106 |

* cited by examiner

*Primary Examiner*—Dieu-Minh Le
(74) *Attorney, Agent, or Firm*—Kenyon & Kenyon

(57) ABSTRACT

A computer processor includes a replay system to replay instructions which have not executed properly and a first event pipeline coupled to the replay system to process instructions including any replayed instructions. A second event pipeline is provided to perform additional processing on an instruction. The second event pipeline has an ability to detect one or more faults occurring therein. The processor also includes a synchronization circuit coupled between the first event pipeline and the second event pipeline to synchronize faults occurring in the second event pipeline to matching instruction entries in the first event pipeline.

18 Claims, 9 Drawing Sheets

| 72 SEQ. NO. | 74 UOP | 76 EXECUTED | 78 THREAD | 80 PATH | 82 RET | 84 EXCEPTION/FAULT CODE (VECTOR) |
|---|---|---|---|---|---|---|
| N | OP | 1 | 0 | 0 | 0 | 14 (e.g., PAGE FAULT) |
| N+1 | OP | 0 | 0 | | | |
| N+2 | OP | 0 | 1 | | | |
| N+3 | OP | 0 | 1 | | | |
| | | | | | | |

152 ROB

FIG. 2

TECHNIQUE FOR SYNCHRONIZING FAULTS IN A PROCESSOR HAVING A REPLAY SYSTEM

FIELD

The present invention is directed to a computer processor. More particularly, the present invention is directed to a technique for synchronizing faults in a processor having a replay system.

BACKGROUND

The primary function of most computer processors is to execute computer instructions. Most processors execute instructions in the programmed order that they are received. However, some recent processors, such as the Pentium® II processor from Intel Corp., are "out-of-order" processors. An out-of-order processor can execute instructions in any order as the data and execution units required for each instruction becomes available. Moreover, the execution of instructions can generate a wide variety of exceptions or faults. A fault handler or exception handler is typically called to handle the fault or exception. Detailed fault information should be stored to allow the fault handler to process or handle the fault. Maintaining the proper fault information can be a complex task, especially for an out of order processor. The prior art has not adequately addressed this problem, particularly where multiple program flows are active.

Therefore, there is a need for a technique to maintain the proper fault information to allow a fault handler to process the fault.

SUMMARY

According to an embodiment, a processor is provided including a replay system to replay instructions which have not executed properly and a first event pipeline coupled to the replay system to process instructions including any replayed instructions. A second event pipeline is provided to perform additional processing on an instruction. The second event pipeline has an ability to detect one or more faults occurring therein. The processor also includes a synchronization circuit coupled between the first event pipeline and the second event pipeline to synchronize faults occurring in the second event pipeline to matching instruction entries in the first event pipeline.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein:

FIG. 2 is a diagram illustrating a re-order buffer according to an example embodiment of the present invention.

DETAILED DESCRIPTION

I. Introduction

Figure 1:
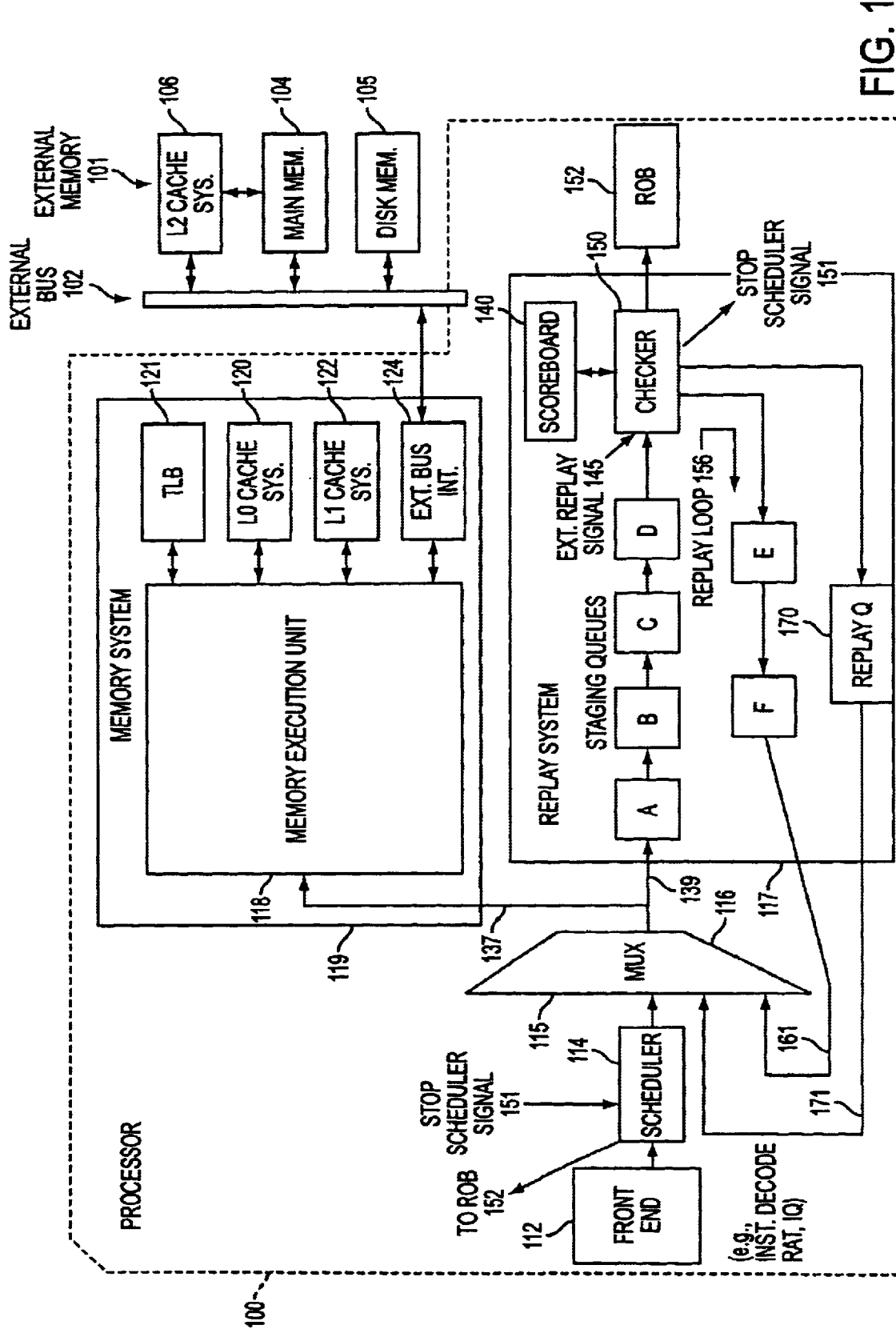
FIG. 1 is a block diagram illustrating a computer system that includes a processor according to an embodiment of the present invention.

According to an embodiment of the invention, a processor is provided that includes a replay system and a memory system. According to an embodiment, instructions may be speculatively scheduled for execution before the source data is available. The replay system includes a checker for determining when an instruction has executed properly or improperly (e.g., executed before the source data was available).

The memory system may be considered to include one or more synchronous event pipelines, and one or more asynchronous event pipelines. The synchronous event pipelines may include, for example, a store event pipeline and load event pipeline. The synchronous event pipelines include stages or a series of steps performed to process or execute an instruction. A number of faults or exceptions can occur during the execution of an instruction. The faults generated and identified within the synchronous event pipeline are referred to as synchronous faults.

In some circumstances, additional processing (e.g., longer latency steps) may be required to process or execute an instruction. An example is where there is a local cache miss (e.g., for a load or store instruction) and the data must be retrieved from an external memory device (which is a long latency operation). The stages or steps of such additional processing (e.g., to retrieve the data from an external device) are called asynchronous event pipelines. This additional processing (of the asynchronous event pipeline) is typically external to the synchronous event pipelines. While the processing occurring in the synchronous event pipeline may complete in a predetermined or known number of stages or events, the processing in an asynchronous event pipeline is less predictable and may be random. Thus, completion or timing of the processing in the asynchronous pipeline is not synchronized with the processing in the synchronous event pipeline, and hence the term "asynchronous." There may be a significant and unknown delay before the processor can determine if a fault occurred during this additional long latency processing in the asynchronous event pipeline. Any faults occurring in the asynchronous event pipeline are generally referred to as asynchronous faults.

If the oldest instruction in the processor has a fault, a fault handler will be called to process or handle the fault. Detailed or specific fault information (e.g., a specific fault code and a linear address which caused the fault) for the oldest instruction may be maintained in a fault register to allow the fault handler to identify and handle the fault. According to one embodiment of the invention, age guarding logic is provided for receiving instruction entries (including specific fault information and a sequence number) in parallel from several synchronous event pipelines and from several asynchronous event pipelines. The age guarding logic, which may include one or more comparators, maintains fault identification information in a fault register for the oldest fault (i.e., for the oldest instruction having a fault).

According to another embodiment of the invention, the asynchronous faults are synchronized (or combined or merged) with the instruction entries in the synchronous event pipelines when the faulting instruction is replayed. A synchronization circuit is provided including a buffer and a comparator, for example. According to an embodiment, the synchronization circuit compares a sequence number of an instruction in the asynchronous event pipeline having an asynchronous fault to the sequence numbers of the instruction entries in the synchronous pipeline. If a match in sequence numbers is found, fault identification information for the instruction having an asynchronous fault is tagged or written to the matching instruction entry in a synchronous event pipeline. This synchronization (or combining or merging) of asynchronous faults to instruction entries in the synchronous pipeline reduces the number of inputs to the age guarding logic. The reduced number of inputs to the age guarding logic can allow the age guarding logic to have a reduced complexity and a decrease in latency.

II. Overall System Architecture

Referring to the Figures in which like numerals indicate like elements, FIG. 1 is a block diagram illustrating a computer system that includes a processor according to an embodiment of the present invention. The processor 100 includes a Front End 112, which may include several units, such as an instruction decoder for decoding instructions (e.g., for decoding complex instructions into one or more micro-operations or uops), a Register Alias Table (RAT) for mapping logical registers to physical registers for source operands and the destination, and an instruction queue (IQ) for temporarily storing instructions. In one embodiment, the instructions stored in the instruction queue are micro-operations or uops, but other types of instructions can be used. The Front End 112 may include different or even additional units. According to an embodiment of the invention, each instruction includes two logical sources and one logical destination, for example. The sources and destination are logical registers within the processor 100. The RAT within the Front End 112 may map logical sources and destinations to physical sources and destinations, respectively.

Front End 112 is coupled to a scheduler 114. Scheduler 114 dispatches instructions received from the processor Front End 112 (e.g., from the instruction queue of the Front End 112) when the resources are available to execute the instructions. Normally, scheduler 114 sends out a continuous stream of instructions. However, scheduler 114 is able to detect, by itself or by receiving a signal, when an instruction should not be dispatched. When scheduler 114 detects this, it does not dispatch an instruction in the next clock cycle. When an instruction is not dispatched, a "hole" is formed in the instruction stream from the scheduler 114, and another device can insert an instruction in the hole. The instructions are dispatched from scheduler 114 speculatively. Therefore, scheduler 114 can dispatch an instruction without first determining whether data needed by the instruction is valid or available.

Scheduler 114 outputs the instructions to a dispatch multiplexer (mux) 116. The output of mux 116 includes two parallel paths, including an execution path (beginning at line 137) that is connected to a memory system 119 (including memory execution unit 118 and local caches) for execution, and a replay path (beginning at line 139) that is connected to a replay system 117. The execution path will be briefly described first, while the replay path will be described below in connection with a description of the replay system 117.

A. Memory System

As shown in FIG. 1, processor 100 includes a memory system 119. The memory system 119 includes a memory execution unit 118, a translation lookaside buffer (TLB) 121, a L0 cache system 120, a L1 cache system 122 and an external bus interface 124. Execution unit 118 is a memory execution unit that is responsible for performing memory loads (loading data read from memory or cache into a register) and stores (data writes from a register to memory or cache). Instructions may be executed out of order.

Execution unit 118 is coupled to multiple levels of memory devices that store data. First, execution unit 118 is directly coupled to L0 cache system 120, which may also be referred to as a data cache. As described herein, the term "cache system" includes all cache related components, including cache memory, and cache TAG memory and hit/miss logic that determines whether requested data is found in the cache memory. L0 cache system 120 is the fastest memory device coupled to execution unit 118. In one embodiment, L0 cache system 120 is located on the same semiconductor die as execution unit 118.

If data requested by execution unit 118 is not found in L0 cache system 120, execution unit 118 will attempt to retrieve the data from additional levels of memory. After the L0 cache system 120, the next level of memory devices is L1 cache system 122. Accessing L1 cache system 122 is typically 4–16 times as slow as accessing L0 cache system 120. In one embodiment, L1 cache system 122 is located on the same processor chip as execution unit 118.

If the data is not found in L1 cache system 122, execution unit 118 is forced to retrieve the data from the next level memory device, which is an external memory device coupled to an external bus 102. Example external memory devices connected to external bus 102 include a L2 cache system 106, main memory 104 and disk memory 105. An external bus interface 124 is coupled between execution unit 118 and external bus 102. Execution unit 118 may access any external memory devices connected to external bus 102 via external bus interface 124. The next level of memory device after L1 cache system 122 is an L2 cache system 106. Access to L2 cache system 106 is typically 4–16 times as slow as access to L1 cache system 122, for example.

After L2 cache system 106, the next level of memory device is main memory 104, which typically comprises dynamic random access memory ("DRAM"), and then disk memory 105 (e.g., a magnetic hard disk drive). Access to main memory 104 and disk memory 105 is substantially slower than access to L2 cache system 106. In one embodiment (not shown), the computer system includes one external bus dedicated to L2 cache system 106, and another external bus used by all other external memory devices.

A copy of each instruction (or micro-op) output from front end 112 is also stored in a re-order buffer (ROB) 152 (also known as an instruction pool) in program order. The ROB 152 also stores several fields or other information for each instruction to keep track of the status of each instruction. If an instruction has been properly executed (instructions may be executed out of order), the instruction is then retired (or committed to architectural state) in program order. After an instruction has been retired, it is then deleted from ROB 152.

FIG. 2 is a diagram illustrating a ROB according to an example embodiment. The ROB 152 is a buffer that includes several fields for each instruction or micro-op (UOP), including: a sequence number 72 which identifies the program order of the instruction, a copy of the instruction 74 or UOP itself, an executed field 76 indicating whether or not the instruction has been executed, the thread 78 for the instruction (processor 100 is a multi-threaded machine in this embodiment), a path field 80 (because there can be multiple paths for each thread), a retired field 82 indicating that the instruction has executed properly and is ready to be retired (instructions must be retired in program order) and an exception or fault vector 84 that identifies a general error exception or fault caused by the execution of the instruction. (As used herein, the terms "exception" and "fault" mean generally the same thing, or may be used interchangeably). The exception vector (or code) 84 is normally clear (e.g., all zeros) unless the processor detects a fault/exception during execution of the instruction. As shown in FIG. 2, the first instruction in the ROB 152 has a sequence number N, has been executed (indicated by the 1 in the executed field 76), belongs to thread 0, is not ready for retirement (indicated by the 0 in the RET field 82), and caused a page fault (as indicated by the 14 stored in the fault vector 84 for this instruction), for example.

According to an embodiment of the invention, the path field 80 identifies those instructions which correspond to a particular path or program flow. As noted above, processor 100 is a speculative processor in which instructions may be executed out of order. When a branch prediction is encountered in the instruction stream, branch prediction is used to predict whether or not the branch will be taken. Based on the prediction, instructions are fetched and executed along a predicted (or speculative path). If it turns out that the branch was mispredicted, instructions are fetched from the correct path. To distinguish between the bad instructions of the mispredicted path and the new instructions from the correct path and, a new path or program flow is assigned to the new instructions (i.e., the correct path) whenever a mispredicted branch is encountered.

According to an embodiment of the invention, there can be multiple sources of faults or exceptions occurring every processor cycle. These possible exceptions or faults can be generated from different sources in the processor. In many cases, the execution of an instruction may generate a fault or exception. As understood by those skilled in the art, processor 100 can include a variety of execution units, including the memory execution unit 118, an arithmetic logic unit (ALU), etc. For example, an Arithmetic Logic Unit may perform a division or other mathematical operation on data and generate a divide error or a floating point error. The memory execution unit 118 can generate a variety or memory related errors, including an alignment check error (e.g., where the data does not align with a cache line), a page fault, a hardware or bus error (indicated generally as a Machine Check error), etc. The Machine Check error could include a variety of hardware type errors that may be detected by memory execution unit 118, including a bus error, a parity error, an error correcting code (ECC) error, etc.

According to an embodiment of the invention, the processor 100 is used with virtual memory in which a linear address space is divided into pages that can be mapped into physical memory (e.g., main memory 104 and cache) and/or disk storage (e.g., disk memory 105). When a program references or addresses a logical address in memory, the processor translates the logical address into a linear address and then uses its paging mechanism to translate the linear address into a corresponding physical address. The processor uses page tables and page directories stored in memory to translate the address. The most recently accessed page directory and page table entries are cached in the transaction lookaside buffer (TLB)121. If the page containing the linear address is not currently in physical memory (i.e., a TLB miss), the processor must calculate the physical address based on the linear address (i.e., linear address to physical address translation), also known as a page walk. If a specified page table entry is not present in main memory, the address translation cannot be performed and the processor generates a page fault (specifically a page not present page fault). In response to this page fault, a fault handler in the operating system will load the page table entry from disk memory 105 into main memory and cache systems, and then restart (or re-execute) the instruction that generated the page fault.

B. Replay System

Referring to FIG. 1 again, processor 100 further includes a replay system 117. Replay system 117, like execution unit 118, receives instructions output by dispatch multiplexer 116. Execution unit 118 receives instructions from mux 116 over line 137, while replay system 117 receives instructions over line 139. As noted above, according to an embodiment of the invention, some instructions can be speculatively scheduled for execution before the correct source data for them is available (e.g., with the expectation that the data will be available in many instances after scheduling and before execution). Therefore, it is possible, for example, that the correct source data was not yet available at execution time, causing the instruction to execute improperly. In such case, the instruction will need to be re-executed (or replayed) with the correct data. Replay system 117 detects those instructions that were not executed properly when they were initially dispatched by scheduler 114 and routes them back again to the execution unit (e.g., back to the memory execution unit 118) for replay or re-execution.

Replay system 117 includes two staging sections. One staging section includes a plurality of staging queues A, B, C and D, while a second staging section is provided as staging queues E and F. Staging queues delay instructions for a fixed number of clock cycles. In one embodiment, staging queues A–F each comprise one or more latches. The number of stages can vary based on the amount of staging or delay desired in each execution channel. Therefore, a copy of each dispatched instruction is staged through staging queues A–D in parallel to being staged through execution unit 118. In this manner, a copy of the instruction is maintained in the staging queues A–D and is provided to a checker 150, described below. This copy of the instruction may then be routed back to mux 116 for re-execution or "replay" if the instruction did not execute properly.

Replay system 117 further includes a checker 150. Generally, checker 150 receives instructions output from staging queue D and then determines which instructions have executed properly and which have not. If the instruction has executed properly, the checker 150 declares the instruction "replay safe" and the instruction (or a control signal identifying the instruction) is forwarded to ROB 152 where instructions are retired in program order. Retiring instructions is beneficial to processor 100 because it frees up processor resources, thus allowing additional instructions to begin execution.

An instruction may execute improperly for many reasons. Two common reasons are a source (or data register) dependency and an external replay condition. A source dependency can occur when a source of a current instruction is dependent on the result of another instruction. This data dependency can cause the current instruction to execute improperly if the correct data for the source is not available at execution time. Source dependencies are related to the registers.

A scoreboard 140 is coupled to the checker 150. Scoreboard 140 tracks the readiness of sources. Scoreboard 140 keeps track of whether the source data was valid or correct prior to instruction execution. After the instruction has been executed, checker 150 can read or query the scoreboard 140 to determine whether data sources were not correct. If the sources were not correct at execution time, this indicates that the instruction did not execute properly (due to a register data dependency), and the instruction should therefore be replayed.

Examples of an external replay condition may include a local cache miss (e.g., source data was not found in L0 cache system 120 at execution time), incorrect forwarding of data (e.g., from a store buffer to a load), hidden memory dependencies, a write back conflict, an unknown data/address, and serializing instructions. The L0 cache system 120 generates a L0 cache miss signal as an external replay signal 145 to checker 150 if there was a cache miss to L0 cache system 120 (which indicates that the source data for the instruction was not found in L0 cache system 120).

Other signals can similarly be generated to checker 150 to indicate the occurrence of other external replay conditions. In this manner, checker 150 can determine whether each instruction has executed properly or not. If the checker 150 determines that the instruction has not executed properly, the instruction will then be returned to multiplexer 116 via replay loop 156 to be replayed (i.e., to be re-executed at execution unit 118). Instructions routed via the replay loop 156 are coupled to mux 116 via line 161.

In addition, instructions which did not execute properly can alternatively be routed to a replay queue 170 for temporary storage before being output to mux 116 for replay. The replay queue 170 can be used to store certain long latency instructions (for example) and their dependent instructions until the long latency instruction is ready for execution. One example of a long latency instruction is a load instruction where the data must be retrieved from external memory (i.e., where there is a L1 cache miss). When the data returns from external memory (e.g., from L2 cache system 106 or main memory 104), the instructions in the replay queue 170 are then unloaded from replay queue 170 to mux 116 and output by mux 170 for replay. Memory system 119 may signal the checker 150, for example, when the requested data for an instruction stored in replay queue 170 has returned from external memory.

In conjunction with sending a replayed instruction (either along replay loop 156 or output from replay queue 170) to mux 116, checker 150 sends a "stop scheduler" signal 151 to scheduler 114. In such case, checker 150 (or other circuit also sends a control signal to mux 116 identifying whether the line 161 (from replay loop 156) or line 171 (from replay queue 170) should be selected. According to an embodiment of the invention, stop scheduler signal 151 is sent to scheduler 114 in advance of the replayed instruction reaching the mux 116. In one embodiment, stop scheduler signal 151 instructs the scheduler 114 not to schedule an instruction on the next clock cycle. This creates an open slot or "hole" in the instruction stream output from mux 116 in which a replayed instruction can be inserted.

III. An Example Embodiment of A Memory System

Figure 3:
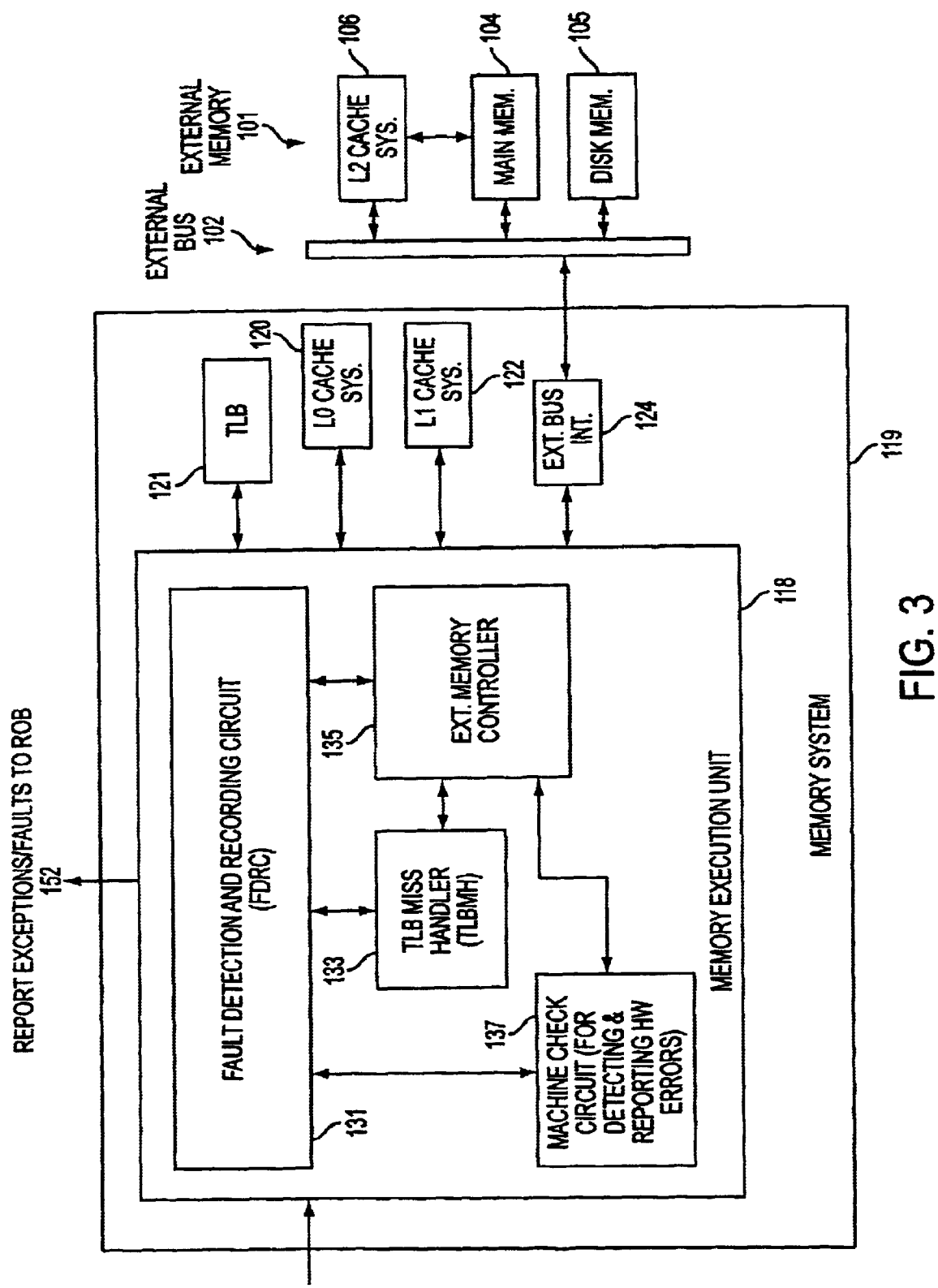
FIG. 3 is a block diagram illustrating a memory system according to an example embodiment of the present invention.

FIG. 3 is a block diagram illustrating a memory system according to an example embodiment. According to an embodiment, the memory system 119 includes a memory execution unit 118, a TLB 121, a L0 cache system 120, a L1 cache system 122 and an external bus interface 124. As noted above, memory execution unit 118 performs memory load and store operations. A group or sequence of steps (e.g., functions or events) that is performed for each load operation may be referred to as the load event pipeline. Likewise, a group or series or steps (functions or events) is also performed for each store operation may be called the store event pipeline. Both of these pipelines are synchronous event pipelines. According to an embodiment, synchronous event pipelines refer to the events or stages which all instructions (of that type) must pass through.

During each load or store operation a number of exceptions or faults can be generated. As used herein, faults (or exceptions) can be categorized as either "synchronous" or "asynchronous." Synchronous faults are those faults which are generated and identified immediately within the execution pipeline or synchronous event pipeline (e.g., faults having a low latency). Examples of synchronous faults (or low latency faults) include a segmentation fault, an alignment fault, and stack fault because each of these exceptions or faults can be identified within the load or store event pipeline. The series of events or functions performed to process or execute an instruction may be referred to as a synchronous event pipeline.

In some cases, however, additional steps or functions must be performed, which may be referred to as asynchronous event pipelines. These additional processing steps usually involve longer latency operations, and are referred to as asynchronous event pipelines. Thus, an asynchronous fault may be considered to be a longer latency fault which cannot be identified within the load or store event pipeline, but requires a longer period of time. Asynchronous faults can occur during one or more long latency operations or procedures performed in an asynchronous pipeline. One example where an asynchronous (or long latency) fault can occur is where there is a L0 cache system miss and a L1 cache system miss, requiring an external bus request (a long latency operation). An asynchronous or long latency fault occurs if a bus error, parity error, ECC error or other hardware error occurs based on the data retrieved from external memory 101. The process of retrieving data from an external memory device 101 may take many processor clock cycles to complete, and this itself creates a long latency. Thus, the processor cannot detect possible errors (e.g., bus error, parity or ECC error) in this external data retrieval until the data has retrieved from the external memory device and checked. Another example of an asynchronous or long latency fault is where a page fault occurs due to a page not present (page table entry not in main memory), as described above. These are only two examples of long latency or asynchronous faults, and others may be possible. The series of steps or functions required to perform such additional long latency processing may be referred to as an asynchronous event pipeline.

The terms "synchronous" and "asynchronous" will now be additionally explained or clarified, according to an embodiment. According to an embodiment, a synchronous event pipeline refers to the steps or events which all (or at least many) instructions go through. An asynchronous event pipeline refers to additional processing (usually long latency in nature) that may be performed on some instructions. Synchronous faults refer to faults that can be detected in a synchronous event pipeline. Asynchronous faults are those faults that are generated and detected during additional processing in the asynchronous pipeline.

The additional processing steps or events in the asynchronous pipeline are not synchronous to the synchronous event pipeline and the replay queue. As an example, if there are 10 stages in the synchronous event pipeline (e.g., for a load) and 10 stages in the (parallel) replay system. A normal instruction will complete execution after 10 stages. If there was any reason for replay, such as data dependency, and assuming that the data dependency was resolved in one replay latency, the instruction will complete its execution in 30 stages (10 for initial execution, 10 to pass through the replay system and 10 to re-execute). Thus, in general, an instruction in the synchronous event pipeline will complete execution in:
10 stages+(number of replays)*20 stages. An instruction that requires additional processing (i.e., processing in an asynchronous event pipeline) will complete in a less predictable number stages (i.e., complete after an unknown delay or latency). Thus, it can be seen that the term "asynchronous" can be used to describe the additional processing because the instruction that is processed in the asynchronous event pipeline does not complete in a predictable time or manner like in the synchronous event pipeline, which typically completes execution in 10+20*(number of replays) stages, as an example. The latency caused from the execution in the additional processing or asynchronous pipeline may be a random number of stages.

Referring again to FIG. 3, the memory execution unit includes a fault detection and recording circuit (FDRC) 131 for detecting and recording faults/exceptions. An external memory controller 135 issues and tracks bus requests over the external bus 102 via external bus interface 124 (e.g., when there is a cache miss on L0 cache and L1 cache). A machine check circuit 137 detects hardware errors (e.g., parity errors, ECC errors and the like) and bus errors and reports these errors to the FDRC 131. A TLB miss handler (TLBMH) 133 performs the linear address to physical address translation in the event there is a TLB miss, and reports any errors or faults in that process to the FDRC 131. One example of a fault that could be detected by the TLBMH 133 is when a page table entry is missing from main memory (during linear to physical address translation), causing a type of page fault (i.e., page not present). The steps or functions performed by the TLBMH 133 may be considered one asynchronous event pipeline. While, the steps or functions performed by the machine check circuit 137 may be considered to be another asynchronous event pipeline.

A. An Example Fault Detection and Recording Circuit

1. Processing Parallel Fault Sources Without Fault Synchronization

Figure 4:
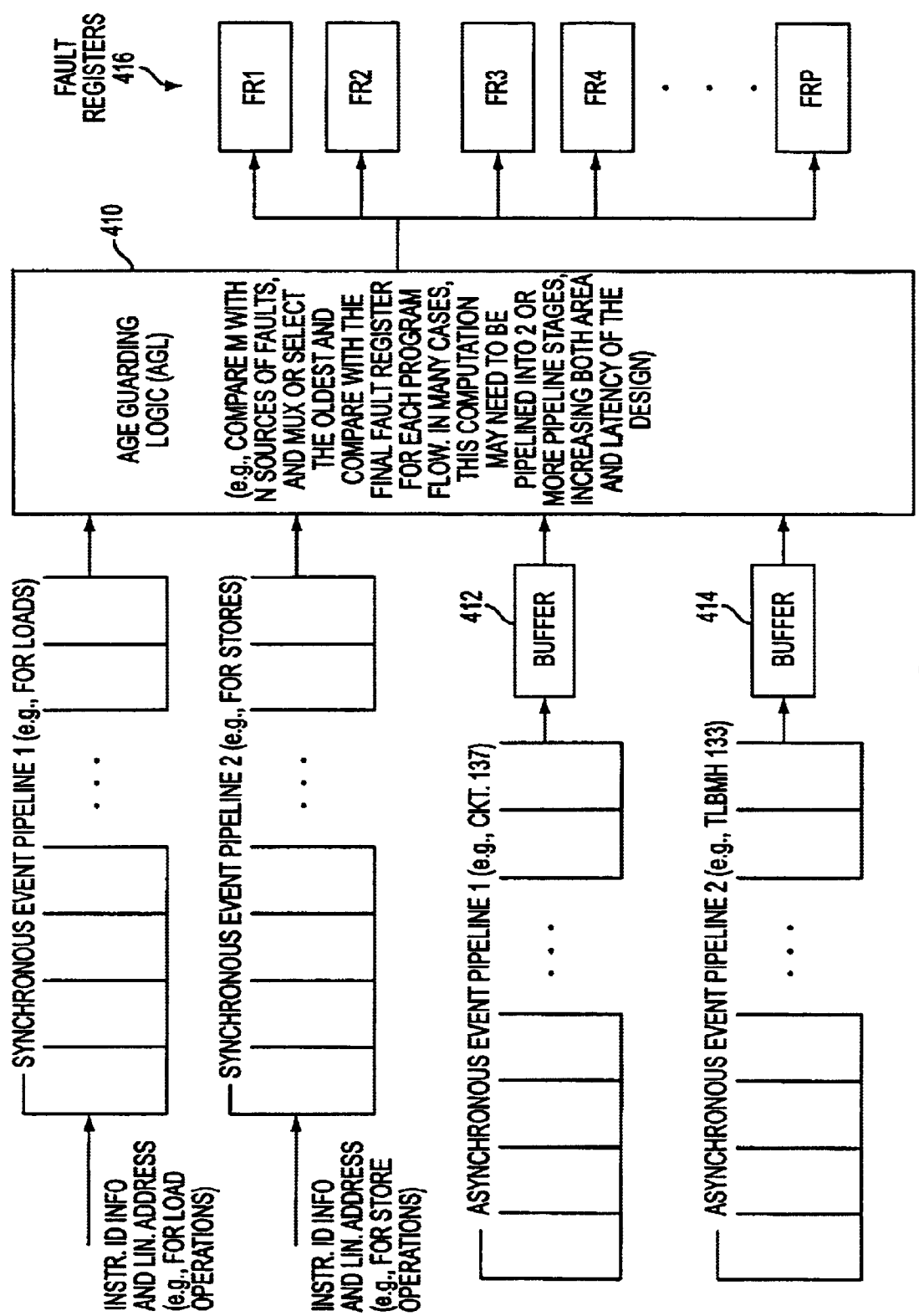
FIG. 4 is a block diagram illustrating a fault detection and recording circuit according to an example embodiment of the present invention.

FIG. 4 is a block diagram illustrating a fault detection and recording circuit according to an example embodiment. The fault detection and recording circuit (FDRC) 131 includes buffers 412 and 414, age guarding logic 410, and one or more fault (or exception) registers 416 (e.g., one fault register per program flow or thread).

A plurality of synchronous event pipelines are shown in FIG. 4, including, for example, a synchronous event pipeline 1 (e.g., event pipeline for loads) and a synchronous event pipeline 2 (e.g., an event pipeline for stores). During instruction execution or processing in these synchronous pipelines, the FDRC 131 of the memory execution unit 118 reports a general fault code or vector to ROB 152 (which identifies the general type of fault) if a fault occurred. The general type of fault (e.g., page fault, vector 14) is then stored in ROB 152. This general fault code does not usually provide sufficient fault information to allow the fault handler to process the fault. Thus, more detailed fault information (including a detailed fault code more specifically identifying the type of fault) will be stored in a fault register.

Each synchronous event pipeline receives as an input an instruction (or uop) ID information and a linear address as the inputs for a series of instructions (e.g., load instructions). The instruction ID information can include an instruction or instruction ID (which identifies the instruction or uop or opcode), a program flow or thread ID (identifying the program flow for the instruction or uop) and a sequence number. As the instruction is processed along each stage of the event pipeline, a specific fault code (identifying the specific type of fault) is generated as well if a fault or exception occurred during execution. All of this information (instruction ID information, linear address or operand(s) and a specific fault code for each instruction) is input to the AGL 410 for each synchronous pipeline. If no fault occurs, then the specific fault code is clear (e.g., all zeros), for example.

A plurality of asynchronous event pipelines are also shown in FIG. 4, including an asynchronous event pipeline 1 (e.g., representing the functions or events performed by the machine check circuit 137) and an asynchronous pipeline 2 (e.g., representing the functions or events performed by the TLBMH 133). These pipelines may be considered asynchronous because they each involve performing long latency operations (such as an address translation or an external bus request), and thus, can result in asynchronous faults. The outputs of these asynchronous pipelines may include an instruction ID information, a linear address or operand(s) and a specific fault code for each instruction (if a fault occurred). Age guarding logic(AGL) 410 receives instruction identification information, operands (or a linear address) and a specific fault code (if a fault occurred) from each asynchronous pipeline as well.

Thus, it can be seen that the AGL 410 receives inputs from two synchronous event pipelines and two asynchronous event pipelines, as an example (but any number of inputs could be received). The function of AGL 410 is to maintain fault identification information (e.g., specific fault code, address and sequence number) for the oldest fault (e.g., smallest sequence number) in each fault register on a per program flow (or per thread) basis. For example, fault register FR1 is assigned to thread 1, FR2 is assigned to thread 3, . . . and FRP is assigned to thread P. Thus, the function of AGL 410 is to maintain the specific fault code for the oldest fault in thread 1 in FR1, to maintain the specific fault code for the oldest fault in thread 2 in FR2, etc. According to an embodiment of the invention, the AGL 410 compares the sequence numbers for the four inputs where a fault is indicated (e.g., a nonzero specific fault code) and selects the oldest fault on a per thread (or per program flow) basis. The inputs are simply discarded where no fault is indicated. The oldest fault for each thread or program flow is then compared to the corresponding fault register to determine if the newly received fault is older than the fault already recorded in the fault register. As noted above, instructions can be executed out of order in processor 100, and thus, an older fault (e.g., smaller sequence number) may replace a newer fault already present in the fault register.

Figure 5:
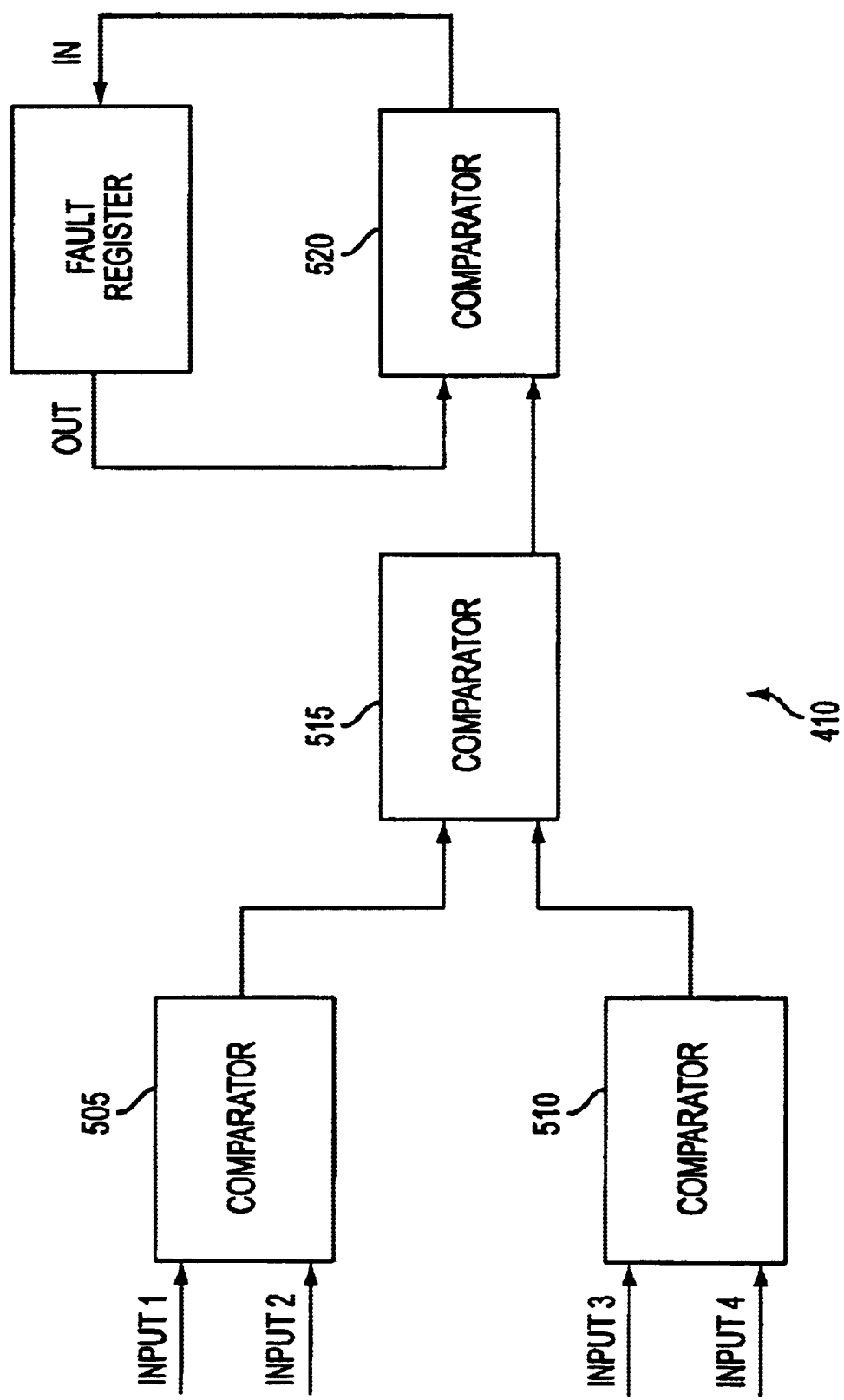
FIG. 5 is a block diagram illustrating an age guarding logic according to an example embodiment of the present invention.

The AGL 410 can be implemented, for example, using an arrangement of comparators, typically involving two or more stages. FIG. 5 is a block diagram illustrating an age guarding logic according to an example embodiment of the present invention. As shown in FIG. 5, the AGL 410 includes comparators 505, 510, 515 and 520, with each comparator selecting and outputting the oldest fault value (i.e., selecting and outputting the fault having the smaller sequence number). Comparator 505 compares inputs 1 and 2, while comparator 510 compares inputs 3 and 4. Comparator 515 compares the outputs of comparators 505 and 510. Comparator 520 compares the output of comparator 515 and the sequence number of the fault recorded in the fault register FR. If the fault selected by comparator 515 is older (e.g., smaller sequence number) than the fault presently recorded or stored in the fault register, then the fault recorded in the fault register is replaced with the older fault. Otherwise, the fault recorded in the fault register is left unchanged. This can be performed for each of the fault registers (one fault register per thread or program flow).

The AGL circuit illustrated in FIG. 5 is provided merely as an example. There are a wide variety of ways in which this circuit can be implemented. For example, all four inputs can be compared in a single clock cycle using one level of comparators. In general, this would decrease the processing latency at the expense of increasing cycle time (reducing the frequency), and would typically require more area (or silicon) to achieve because more aggressive circuit designs for comparators are needed.

2. Synchronizing Asynchronous Faults

Figure 6:
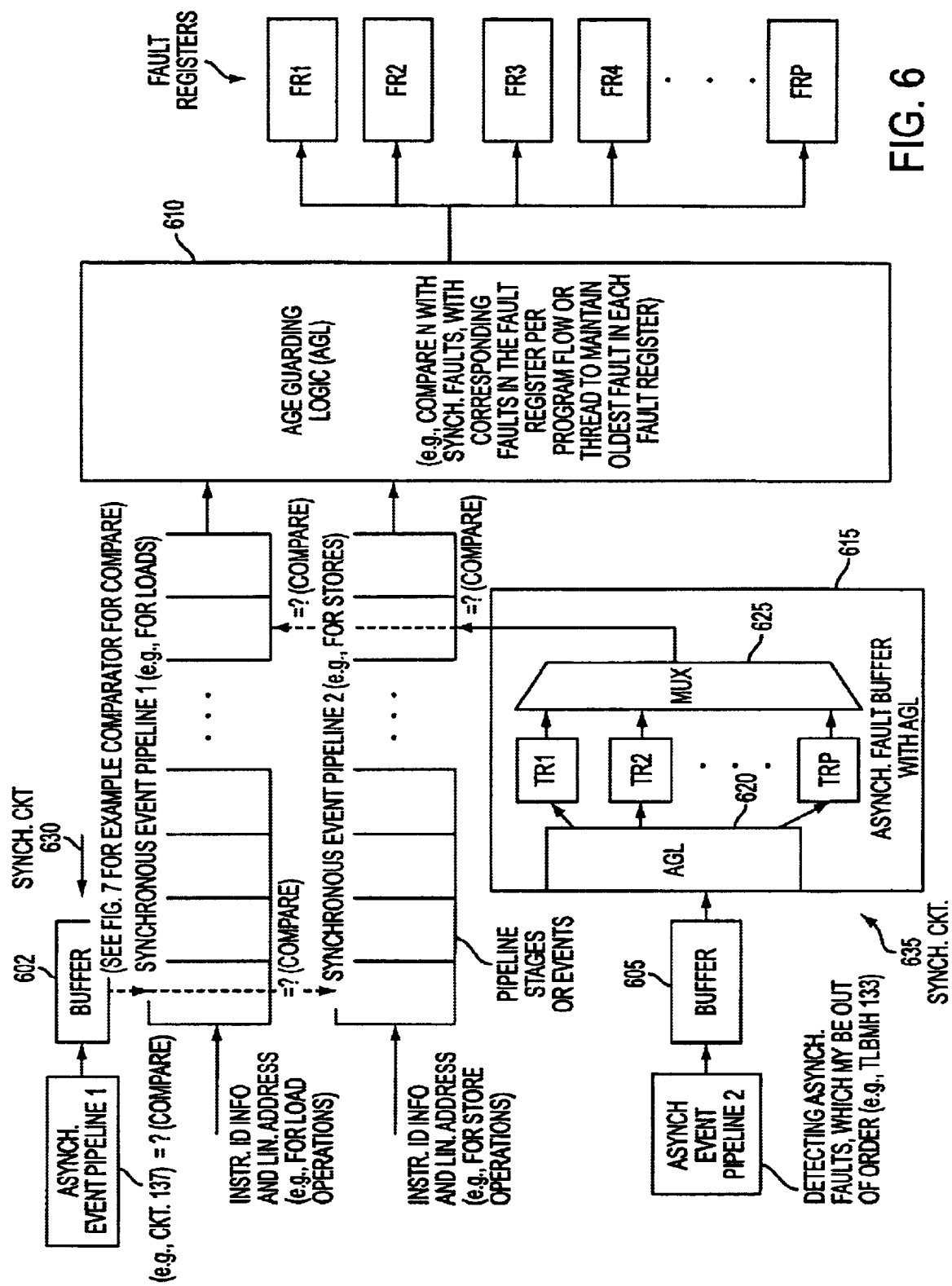
FIG. 6 is a block diagram illustrating a fault detection and recording circuit according to another example embodiment of the present invention.

FIG. 6 is a block diagram illustrating a fault detection and recording circuit according to another example embodiment. The fault detection and recording circuit includes buffers 602 and 605, an age guarding logic (AGL) 610, an asynchronous fault buffer 615 (with AGL) and a plurality of fault registers FR1, FR2, . . . FRP. One function of the fault detection and recording circuit of FIG. 6 is to maintain fault identification information (e.g., a specific fault code, the linear address and sequence number) for the oldest fault per thread (or per program flow) in the corresponding fault register. However, while the circuit of FIGS. 4–5 receives and processes all fault sources (event pipelines) in parallel, the circuit of FIG. 6 synchronizes the asynchronous faults with the instruction entries in the synchronous pipeline. This can result in a faster AGL circuit and which requires less area as compared to some implementations of the parallel circuit of FIGS. 4–5. Also, less instruction information must be carried in the asynchronous pipleline for the circuit of FIG. 6.

The ability to synchronize (e.g., merge or combine) the asynchronous faults with the instruction entries in the synchronous pipeline is made possible by the replay system 117 in one embodiment. In the absence of the Replay System 117, the processor 100 may otherwise stall while awaiting the processor to process a long latency fault (e.g., for a page not present type of page fault—a processor could stall while waiting for the new page table entry to be loaded into memory and then to complete the linear to physical address translation).

However, according to an embodiment of the invention, instructions are speculatively scheduled for execution before the source data is available. As a result, if a load or store instruction is executed improperly because the data was not available at execution time (e.g., because there is a local cache miss requiring an external bus request to retrieve the data), this will cause the checker 150 to replay or re-execute the load or store instruction until it executes properly. Thus, each replayed instruction will again reappear in a synchronous event pipeline to be processed or re-executed.

In addition, the instruction may also be processed by one or more specialized units (e.g., TLBMH 133 or machine check circuit 137), the steps or operation of each also known generally as an asynchronous event pipeline, to perform a relatively long latency process or operation (such as an address translation) required to complete execution of the instruction. Two example asynchronous event pipelines are shown in FIG. 6 (asynchronous event pipeline 1 and asynchronous event pipeline 2). An asynchronous fault (e.g., page fault) may have been generated for this instruction during instruction processing or execution in the asynchronous event pipeline. Because the instruction is being replayed, the instruction will pass through the synchronous event pipeline each time it is replayed (or re-executed). According to an embodiment, a specific fault code for an instruction from the asynchronous event pipeline having a fault can be written or tagged to the matching or corresponding instruction entry in the synchronous pipeline when the matching instruction entry arrives in the synchronous event pipeline. This, in essence, allows asynchronous faults to be synchronized or to be transformed into synchronous faults. In this manner, asynchronous faults and synchronous faults can be merged or combined. This reduces the number of fault sources input into the age guarding logic (AGL) 610, thereby reducing circuit complexity and latency.

Referring to FIG. 6, an asynchronous event pipeline 1 processes an instruction and generates an asynchronous fault (e.g., a page fault). The asynchronous event pipeline 1 outputs instruction entries, which may be a simplified instruction entry. The simplified instruction entry could include a sequence number, a thread ID or program flow ID and an identification of the specific fault (which may be the specific fault code or some subset of this code, for example). This instruction entry from the asynchronous event pipeline is stored in a buffer 602 (there may be many buffers 602). A comparison is then performed between the sequence number of the instruction entry in buffer 602 and the sequence numbers of the instruction entries in each of the synchronous event pipelines.

Figure 7:
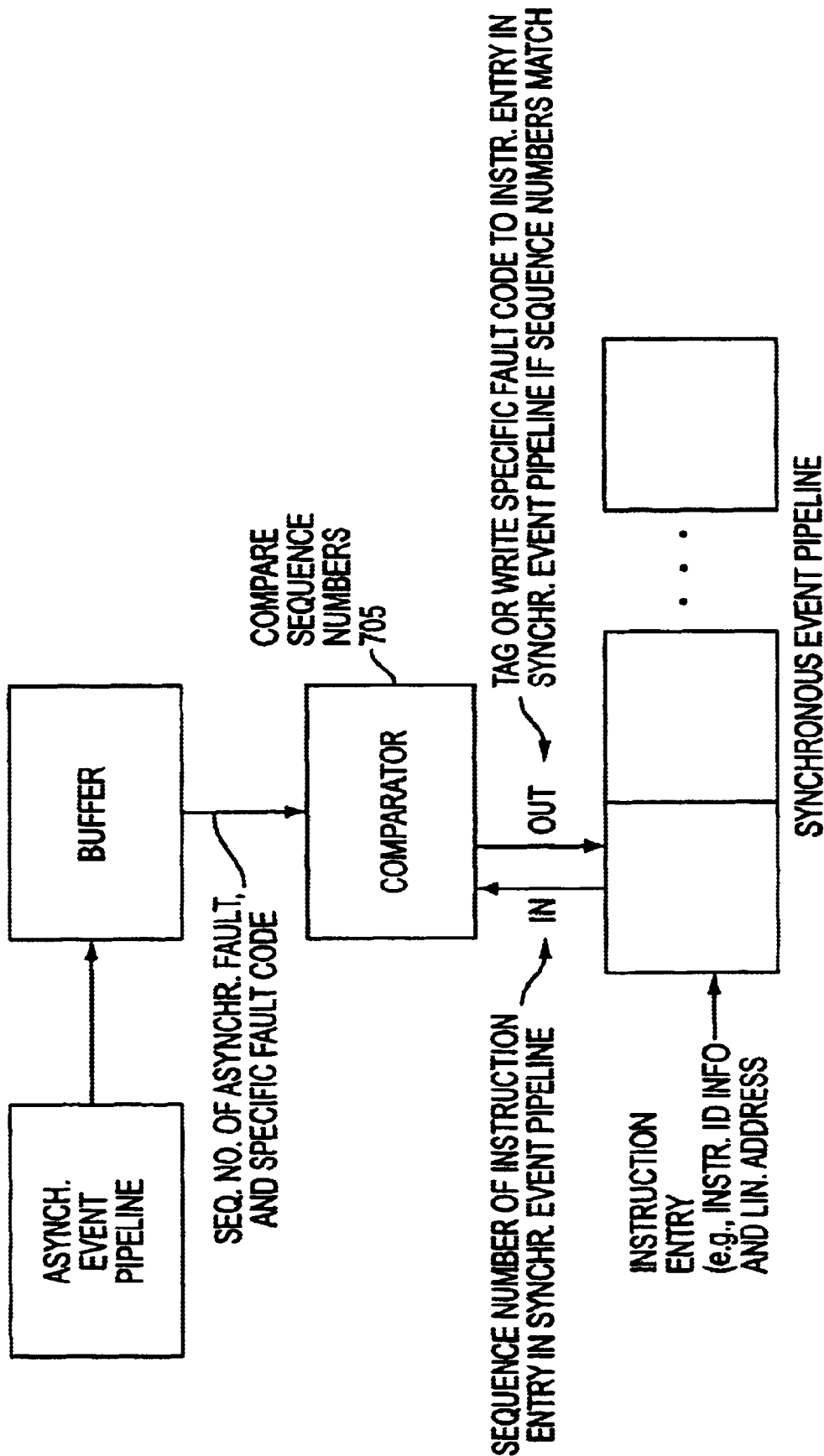
FIG. 7 is a block diagram illustrating an operation of the comparison of the sequence numbers between the entries in the asynchronous event pipeline and the synchronous event pipeline.

FIG. 7 is a block diagram illustrating an operation of the comparison of the sequence numbers between the entries in the asynchronous event pipeline and the synchronous event pipeline according to an example embodiment. As shown in FIG. 7, a comparator 705 compares the sequence number of the asynchronous pipeline entry stored in buffer 602 to the sequence number of each the instruction entries in one or more synchronous pipelines (as the instruction entries enter or pass through the synchronous pipeline). If a match is found, the specific fault code (or information identifying the specific asynchronous fault) is written or tagged to the matching instruction entry in the synchronous event pipeline. This synchronizes the asynchronous faults with the synchronous pipeline, in effect, transforming the asynchronous fault into a synchronous fault. Therefore, buffer 602 and comparator 705 may be considered as part of a synchronization circuit 630 to synchronize asynchronous faults with the instruction entries in the synchronous pipelines.

It should be noted that only the simplified instruction (e.g., sequence number, specific fault identification and thread ID) is required in the asynchronous event pipelines because the instruction entries in the synchronous pipelines provide the remaining instruction information for each instruction (e.g., uop or instruction ID, linear address). This simplifies the asynchronous event pipeline.

The use of a simple input buffer (e.g., buffer 602) to store instruction entries from the asynchronous pipeline works fine where the asynchronous pipeline generates faults which are in program order (e.g., such as the machine check circuit 137). In such a case, the older fault will typically be written or tagged back to the matching instruction entry in the synchronous event pipeline before a newer fault will be received at buffer 602 from the asynchronous event pipeline.

A problem may arise, however, if the instruction entries from the asynchronous event pipeline can be generated out of order. An example is the TLB miss handler (TLBMH)133 (FIG. 3) which can speculatively perform a linear to physical address translation for different out of order instructions, and faults can occur on each translation. As an illustration, an instruction entry is stored in buffer 602 and then an older instruction entry (e.g., having a smaller sequence number) is output to buffer 602 from an asynchronous event pipeline. This may cause the older instruction entry in the buffer 602 to be overwritten (and lost) by the newer entry, which is a problem because a function of the fault detection and recording circuit 131 is to maintain the oldest faults (e.g., the specific fault code and linear address for the fault) in the fault registers.

According to an example embodiment, one solution to this problem is to use an asynchronous fault buffer 615 with age guarding logic (AGL) 620, shown at the lower portion of FIG. 6. The asynchronous fault buffer 615 includes an age guarding logic (AGL) 620, a plurality of temporary registers (TR1, TR2, TR3, ... TRP), and a multiplexer (mux) 625. There is preferably one temporary register (TR) per thread or program flow (i.e., same number of temporary registers TR as the number of fault registers, FR).

As shown in FIG. 6, the instruction entries (which may preferably include only the simplified instruction entries) from the asynchronous event pipeline 2 are output to buffer 605. AGL 620 operates similarly to (or the same as) the AGL 410 (FIG. 4). The AGL 620 performs an age guarding function for the asynchronous fault buffer 615 to maintain the oldest instruction entry in each the temporary registers (TR), on a per thread or per program flow basis. If the instruction entry in buffer 605 has a fault and is older than the instruction entry stored in the corresponding temporary register (of the same thread or program flow), the AGL 620 replaces the entry in the temporary register (TR) with the older instruction entry having a fault. Mux 625 then outputs one or more of the instruction entries in the temporary registers (TR) for comparing the sequence number of the TR entry to the sequence number of the instruction entries in each of the synchronous event pipelines. This comparison operation can be performed, for example, as described above for FIG. 7. If the sequence numbers match, then a specific fault code (or information identifying the specific asynchronous fault) is written or tagged to the matching instruction entry in the synchronous event pipeline.

The use of age guarding logic (AGL) 620 in buffer 615 allows faults to be received and handled out of order without overwriting or losing the older faults (the older instruction entries having a fault). Therefore, buffer 605, asynchronous fault buffer 615 (with AGL 620) and comparator 705 may be considered as part of a synchronization circuit 635 to synchronize asynchronous faults (including out of order faults) with the instruction entries in the synchronous pipelines.

Although only one buffer 602 is shown, and only one asynchronous fault buffer 615 (with AGL) is shown, the circuit may include a plurality of such buffers and the associated or required number of comparators (e.g., comparators 705) for synchronizing a plurality of asynchronous fault sources with a plurality of synchronous event pipelines.

Also, mux 625 may be one mux, or may be a plurality of muxes for selecting and outputting the entries or sequence numbers from a plurality of temporary registers for comparison with the instruction entries in the synchronous pipelines. Thus, the use of multiple muxes 625 allows the sequence numbers for a plurality of threads (or program flows) to be simultaneously compared to the sequence numbers of the instruction entries in the synchronous event pipelines.

In the example shown in FIG. 6, the four fault sources (two synchronous fault sources and two asynchronous fault sources) are combined or merged into two fault sources by writing or tagging the fault codes (or fault information) for asynchronous faults into the matching or corresponding instruction entries in the synchronous event pipeline. In general, M fault sources can be merged or combined into N fault sources, where N is less than M (and also where the N fault sources are provided in event pipelines which receive replayed instructions). The two combined fault sources (each combining synchronous and asynchronous faults) are then input into AGL 610. AGL 610 performs a similar function to AGL 410 (FIG. 4), but has fewer inputs (e.g., only two inputs in this example) for comparison. AGL 610, however, could receive and compare any number of fault source inputs to maintain the oldest faults (fault information) stored in the fault registers (FR) on a per thread or per program flow basis.

Figure 8:
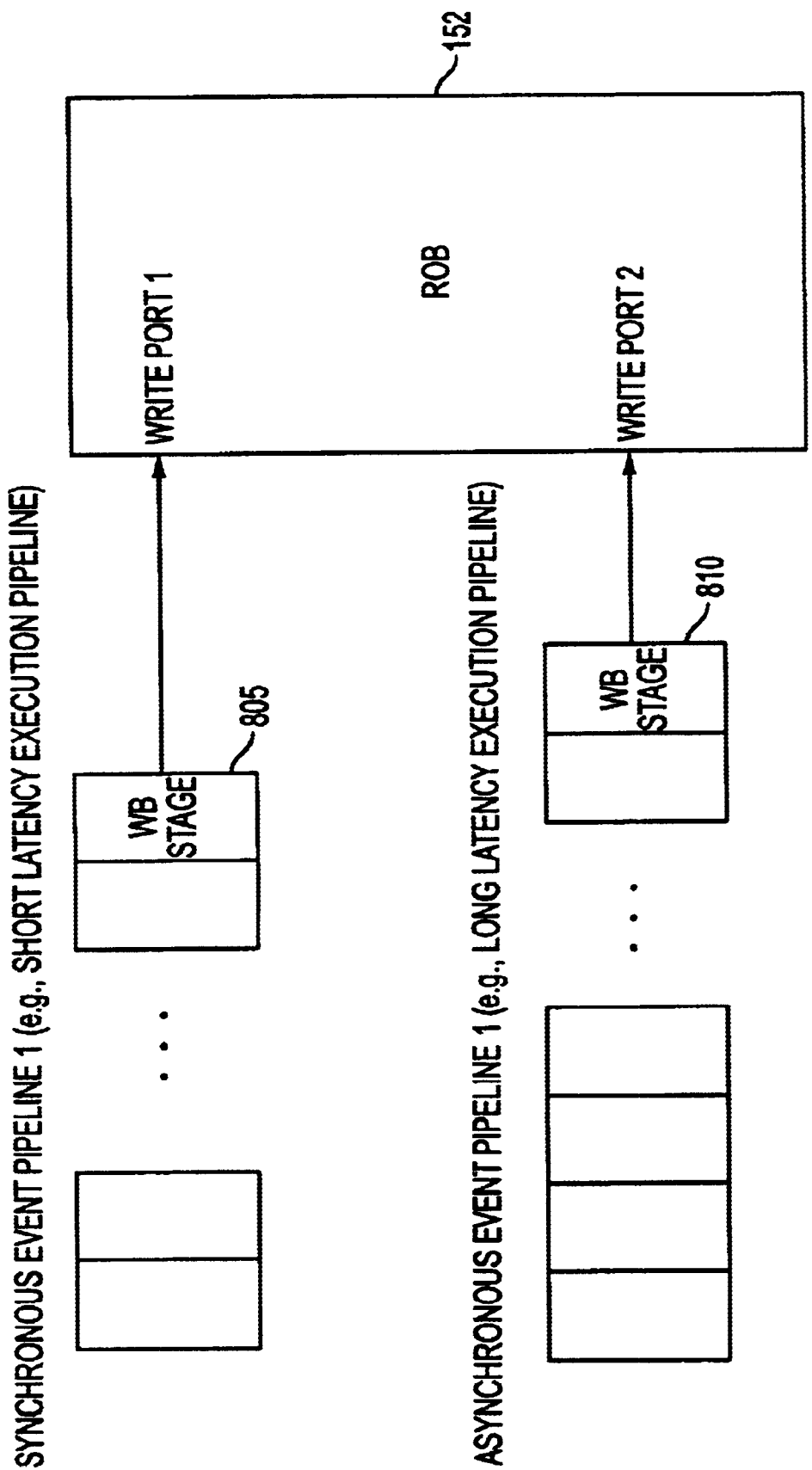
FIG. 8 is a block diagram illustrating a portion of a fault detection and recording circuit according to an example embodiment of the present invention.

FIG. 8 is a block diagram illustrating a portion of a fault detection and recording circuit according to an example embodiment of the present invention. As noted above, after execution of an instruction, a fault code 84 will be written back to the ROB 152 (FIGS. 1–2). In FIG. 8, a synchronous event pipeline 1 includes several stages, including a write back (WB) stage 805 to write back to the ROB 152. Likewise, an asynchronous event pipeline includes several stages, including a write back (WB) stage 810. An output of WB stage 805 is connected to a write port 1 of ROB 152, while an output of WB stage 810 is connected to a write port 2 of ROB 152. ROB 152 may include a mux or selection circuit for selecting fault information (e.g., a fault code) received on one of the write ports. Although only one synchronous pipeline and one asynchronous pipeline are shown, it should be understood that any number of pipelines can be provided. As shown in FIG. 8, if fault synchronization is not performed, ROB 152 will typically include one write port for each fault source.

Figure 9:
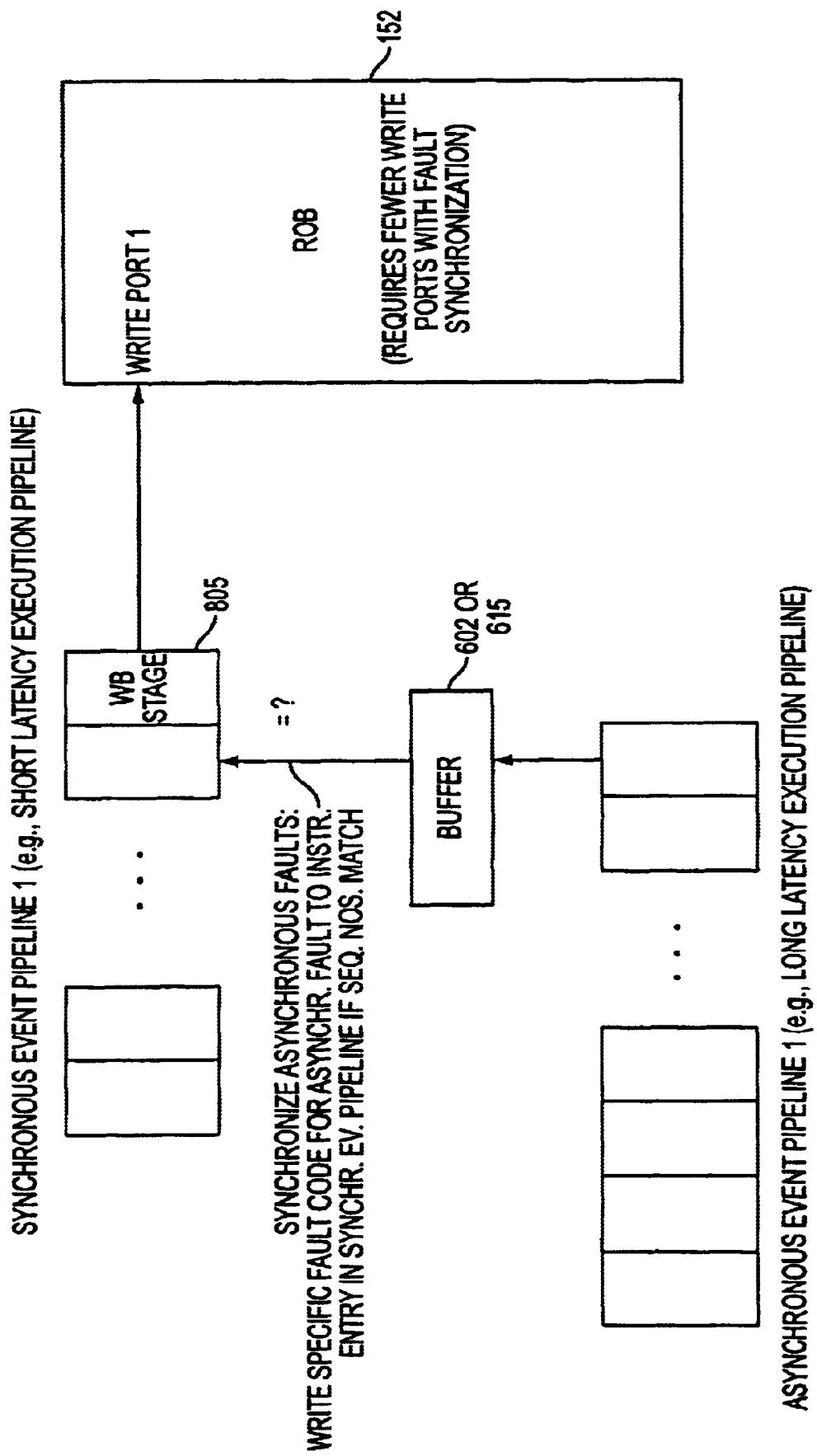
FIG. 9 is a block diagram illustrating a portion of a fault detection and recording circuit according to another example embodiment of the present invention.

FIG. 9 is a block diagram illustrating a portion of a fault detection and recording circuit according to another example embodiment of the present invention. In FIG. 9, faults from the asynchronous event pipeline 1 are synchronized to corresponding instruction entries in the synchronous event pipeline 1. The circuit of FIG. 9 operates in a similar fashion to that shown in FIG. 6. A buffer (such as either buffer 602 or a asynchronous fault buffer 615) is provided between the asynchronous event pipeline 1 and the synchronous event pipeline 1. As described above in connection with FIG. 6, if there is a match between sequence numbers, specific fault information of an asynchronous fault (such as a specific fault code) is written to a corresponding instruction entry in the synchronous event pipeline 1. Thus, by synchronizing the asynchronous faults and synchronous faults, two fault sources are merged or combined into a single fault source. As a result, an additional advantage of fault synchronization is that ROB 152 requires fewer write ports. In the example of FIG. 9, only one write port is required, thereby simplifying ROB 152.

Referring again to FIG. 1, the ROB monitors the instructions and marks those instructions which execute properly as being ready for retirement (but will be retired in program order). If an instruction generated a fault, the ROB 152 receives a general fault/exception vector (e.g., from the memory execution unit ) and stores the fault vector in the ROB entry for the instruction. If the oldest instruction has a fault or exception, the ROB 152 then calls the appropriate fault handler (a program for handling the fault). The fault handler then reads the specific (or detailed) fault code and linear address stored in the fault register (alternatively, this information may be first pushed onto a stack prior to calling the fault handler). As an example, a page fault handler may retrieve and load the corresponding page table entry if there was a page not present type of page fault. After the fault is handled, the processor will continue processing instructions beginning at either the instruction that caused the fault, or an instruction after the faulting instruction, depending on the type of exception or fault. Therefore, the specific fault/exception code and linear address for the oldest fault may be stored in the fault registers to allow the fault handler to identify and process (i.e., handle) the fault.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A processor comprising:
   a replay system to replay instructions which have not executed properly;
   a first processing circuit coupled to the replay system to process instructions including any replayed instructions;
   a second processing circuit to perform additional processing on an instruction, the second processing circuit having an ability to detect one or more faults occurring therein; and
   a synchronization circuit coupled between the first processing circuit and the second processing circuit to synchronize faults occurring in the second processing circuit to matching instruction entries in the first processing circuit.

2. The processor or claim 1 wherein the first processing circuit comprises a first event pipeline, and wherein the second processing circuit comprises a second event pipeline.

3. A method comprising:
   detecting that an instruction has not executed properly;
   replaying an instruction in a first event pipeline;
   performing additional processing on an instruction in a second event pipeline;
   detecting a fault for the instruction occurring in the second event pipeline;
   matching the instruction having a fault which occurred in the second event pipeline to an instruction entry for the same instruction that is being replayed in the first event pipeline;
   writing or tagging fault identification information for the fault to the matching instruction entry in the first event pipeline.

4. A processor comprising:
   a replay system to replay instructions which have not executed properly;
   a synchronous event pipeline coupled to the replay system to process instructions including any replayed instructions;
   an asynchronous event pipeline to perform additional processing on an instruction, the asynchronous event pipeline having an ability to detect one or more asynchronous faults occurring during the additional instruction processing; and
   a synchronization circuit coupled between the synchronous event pipeline and the asynchronous event pipeline to synchronize an asynchronous fault with a replayed instruction in the synchronous event pipeline.

5. The processor of claim 4 wherein the synchronization circuit comprises:
   a buffer coupled to the asynchronous event pipeline for storing an instruction entry for an instruction having an asynchronous fault, the instruction entry including a sequence number and fault identification information identifying the asynchronous fault; and
   a comparator coupled to the buffer and the synchronous event pipeline, the comparator comparing a sequence number of an instruction entry in the synchronous event pipeline with the sequence number of the instruction entry having the asynchronous fault, and writing the fault identification information of the asynchronous fault to the instruction entry in the synchronous event pipeline if a match is found.

6. The process of claim 4 wherein the synchronization circuit comprises:
   an input buffer coupled to the asynchronous event pipeline for storing an instruction entry for an instruction having an asynchronous fault, the instruction entry including a sequence number and fault identification information identifying the asynchronous fault;
   an asynchronous fault buffer having age guarding logic coupled to the input buffer, the asynchronous fault buffer storing an instruction entry for an instruction having an asynchronous fault in a temporary register; and
   a comparator coupled to the asynchronous fault buffer and the synchronous event pipeline, the comparator comparing a sequence number of an instruction entry in the synchronous event pipeline with a sequence number of the instruction entry stored in the temporary register of the asynchronous fault buffer, and writing the fault identification information of the asynchronous fault to the instruction entry in the synchronous event pipeline if a match is found.

7. The processor of claim 6 wherein the asynchronous fault buffer comprises:
   age guarding logic coupled to the input buffer; and
   a temporary register coupled to the age guarding logic to store an instruction entry for an instruction having an asynchronous fault, the age guarding logic maintaining an oldest instruction entry in the register as compared between an instruction entry having an asynchronous fault already present in the temporary register and an instruction entry for an instruction having an asynchronous fault stored in the input buffer.

8. The processor of claim 6 wherein the asynchronous fault buffer comprises:
   age guarding logic coupled to the input buffer;
   one or more temporary registers coupled to the age guarding logic to store one or more oldest instruction entries for an instruction having an asynchronous fault, the age guarding logic maintaining an oldest instruction entry in each temporary register as compared between an instruction entry having an asynchronous fault already present in the temporary register and an instruction entry for an instruction having an asynchronous fault stored in the input buffer; and a mix coupled to the one or more temporary registers for selectively outputting the instruction entry from a selected temporary register to the comparator.

9. The processor of claim 8 wherein there is one temporary register provided for each thread or program flow.

10. A processor comprising:

a replay system to replay instructions which have not executed properly;

a memory execution unit coupled to the replay system to execute load and store instructions, the memory execution unit including:

a synchronous event pipeline to execute load or store instructions, including instructions which have been replayed;

asynchronous event pipeline coupled to the synchronous event pipeline for performing additional processing on instructions, the asynchronous event pipeline having an ability to detect one or more asynchronous faults occurring during the additional instruction processing in the asynchronous event pipeline; and a synchronization circuit coupled between the synchronous event pipeline and the asynchronous event pipeline to synchronize an asynchronous fault with a replayed instruction in the synchronous event pipeline.

11. The processor of claim 10 wherein said synchronization circuit comprises a comparator circuit to compare a sequence number of an instruction entry in the asynchronous event pipeline having a fault to sequence numbers of instruction entries in the synchronous pipeline, the comparator circuit writing fault identification information identifying the asynchronous fault to the instruction entry in the synchronous event pipeline if a match is found.

12. A processor comprising:

a replay system to replay instructions which have not executed properly;

a plurality of synchronous event pipelines coupled to the replay system to process instructions including any replayed instructions;

an asynchronous event pipeline to perform additional processing on an instruction, the asynchronous event pipeline having an ability to detect one or more asynchronous faults occurring during the additional instruction processing in the asynchronous event pipeline;

a synchronization circuit coupled between the synchronous event pipeline and the asynchronous event pipeline to synchronize an asynchronous fault with a replayed instruction in the synchronous event pipeline;

a fault register; and age guarding logic coupled between the plurality of synchronous event pipelines and the fault register, the age guarding logic storing fault information in the fault register for an oldest instruction entry as compared between the instruction entries from the plurality of synchronous pipelines and the fault information already present in the fault register.

13. The processor of claim 12 wherein the fault register stored fault information for an oldest instruction entry, the fault information including a specific fault code and an address.

14. A method of processing faults in a processor comprising:

detecting that an instruction has executed improperly;

replaying the instruction;

performing additional processing on the instruction;

detecting a fault in the additional instruction processing; and writing fault identification information to an instruction entry for the replayed instruction, wherein the performing additional processes comprises performing a long latency operation for the instruction in parallel with the instruction being replayed.

15. The method of claim 14 wherein the writing fault identification information comprises:

comparing a sequence number of the instruction entry for the replayed instruction with the sequence number of the instruction having the fault;

writing fault identification information to the instruction entry for the replayed instruction if there is a match.

16. A method comprising:

detecting that an instruction has executed improperly;

replaying the instruction in a synchronous event pipeline;

performing additional processing on the instruction in an asynchronous event pipeline;

detecting an occurrence of an asynchronous fault during the additional processing of the instruction in the asynchronous event pipeline;

identifying that the instructions in the asynchronous event pipeline having the fault matches the replayed instructions in the synchronous event pipeline; and writing fault identification information into an instruction entry for the replayed in the synchronous event pipeline.

17. The method of claim 16 wherein said replaying comprises replaying the instructions in one of a plurality of synchronous event pipelines.

18. The method of claim 16 and further comprising storing fault identification information for an oldest instruction in a fault register as compared between the instruction entry in the synchronous event pipeline having the fault identification information and fault identification information already present in the fault register.

* * * * *

UNITED STATES PATENT AND TRADEMARK OFFICE
CERTIFICATE OF CORRECTION

PATENT NO. : 6,629,271 B1
DATED : September 30, 2003
INVENTOR(S) : Yung-Hsiang Lee et al.

It is certified that error appears in the above-identified patent and that said Letters Patent is hereby corrected as shown below:

Column 17,
Line 19, change "asynchronous" to -- an asynchronous --

Column 18,
Line 44, change "for the replayed in the" to -- for the replayed instruction in the --.

Signed and Sealed this

Third Day of February, 2004

JON W. DUDAS
*Acting Director of the United States Patent and Trademark Office*